E. R. KNOTT.
AUTOMATIC MACHINE FOR MAKING CAKES.
APPLICATION FILED JAN. 27, 1916.

1,326,067.

Patented Dec. 23, 1919.

Witness
Oscar F. Hill

Inventor
Eustace R. Knott
by Chas. F. Randall
Attorney

UNITED STATES PATENT OFFICE.

EUSTACE R. KNOTT, OF SHARON, MASSACHUSETTS.

AUTOMATIC MACHINE FOR MAKING CAKES.

1,326,067. Specification of Letters Patent. Patented Dec. 23, 1919.

Application filed January 27, 1916. Serial No. 74,695.

*To all whom it may concern:*

Be it known that I, EUSTACE R. KNOTT, a citizen of the United States, residing at Sharon, in the county of Norfolk, State of Massachusetts, have invented a certain new and useful Improvement in Automatic Machines for Making Cakes, of which the following is a specification, reference being had therein to the accompanying drawings.

The invention comprises various improvements in the type of machines utilized for compressing material into cakes of suitable proportion and shape and while it is described as adapted for use in the manufacture of cakes from pop-corn it is obvious that the machine may be used with little or no change with equal efficiency in the manufacture of cakes of various other material. In the manufacture of pop-corn cakes it is very desirable that the material be worked while it is in a heated state so that the compressed cake will, when cool, be thoroughly compact and crisp, and it is a further desideratum that the pressed cakes be free from loose crumbs and scraps. It is, therefore, an object of the present invention to provide a machine which will operate at a speed commensurate with the ability of an operative to properly feed the mold while the material is in its best condition to be molded into cakes and which will operate to efficiently remove excess crumbs and provide for the separation of loose scraps from the compressed cakes before the machine delivers the product. It is also important, in order to produce a clean and shapely cake of compressed pop-corn, that the machine will so operate during the process as to prevent the adhesion of the sticky coated pop-corn to the operating parts and thereby avoid the disfiguration of the pop-corn cakes.

In the illustrated and preferred embodiment of the invention the machine consists of a mold or molding plate disposed to rotate or move with relation to a table or member forming a bottom for the mold or mold-plate, the table being provided with means to admit of the escape of scraps or crumbs from the pressed cake, and the material being suitably fed into the mold-chambers of the mold-plate and therein compressed by means of a relatively moving compressor and subsequently ejected by an ejecting device. The invention further consists of means for relatively moving the compressed cake or cakes in the mold-chambers so as to eliminate the pocket or space produced by the compressing action of the compressor and avoid the collection of crumbs or excess material in the pocket and for the further purpose of evening a surface of a compressed cake with a surface of the mold-plate to permit the clearance and removal from the surface of the mold-plate and the evened surface of the cake by a clearer and collector of the excess and loose crumbs.

In the accompanying drawings,—

Figure 1:
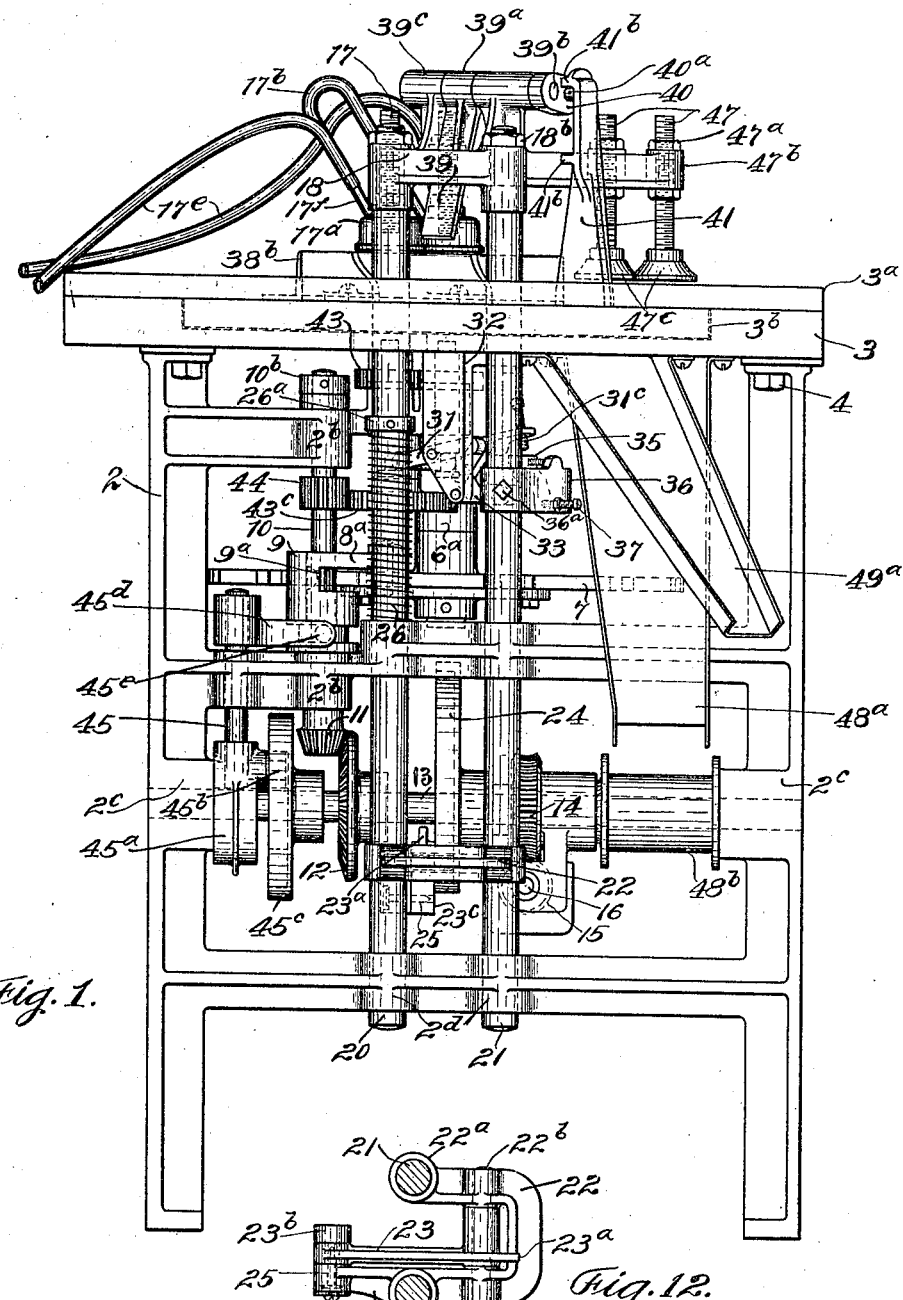
Figure 1 is a side elevation of the improved machine with the compressing plungers and ejectors shown in withdrawn position with relation to the mold-plate.

Fig. 8, Sheet 2, is a plan view in detail of the bracket and the coupler supported thereby and showing the carrier-rod in cross-section with its yieldable tappet for actuating the coupler.

Fig. 9, Sheet 2, is a side elevation, in detail, of the parts shown in Fig. 8, the bracket being shown in vertical cross-section, the pivots of the coupler lever and the coupler dog also being in cross-section.

Fig. 10, Sheet 2, is a plan view of a compressor head with its threaded stem removed and showing the nipples for connection with a water-circulating system.

Fig. 11, Sheet 2, is a detail, central, vertical section through a compressor head and showing the threaded stem in elevation.

Fig. 12, Sheet 1, is a detail plan view of the yoke and the give-away device connected to the carrier-rods which are shown in section, and Fig. 13 is a side elevation of the parts illustrated in Fig. 12 and showing a fragment of the carrier-rod.

The machine here illustrated embodies a suitable frame 2 having fastened upon the upper ends of its standard or corner legs an appropriately shaped table 3, this being secured to the frame by cap-screws 4. The corner edges of the table may be provided with a guard or rail $3^a$ to prevent material upon which the machine operates from being wasted or scattered from the surface of the table and in the form herein shown the table is provided with a substantially central recess or annular depression $3^b$, Fig. 3, into which there is movably fitted a mold in the form of a plate or disk 5 which is provided with an outer, annular series of mold-chambers $5^a$ and an inner and concentric series of mold-chambers $5^b$, which mold-chambers obviously may be of any desired form or contour as is requisite to produce the cake of desired shape, the mold-chambers in the disk 5 in this case being shown as of circular form. The mold-plate 5 is secured upon the upper end of a shaft 6 which projects vertically downward through the table 3 and is supported in a downwardly extending bearing portion $6^a$ on the table 3. The mold-plate 5 is adapted to be rotated in intermittent progressive steps by any suitable means and an efficient device for the accomplishment of this rotation is shown as including a Geneva or index wheel 7, Figs. 1 and 4 which is secured upon the lower end of the mold-plate shaft 6 and which is provided at its perimeter with a plurality of radial slots $7^a$, twelve in number to the number of mold-chambers in one series in the present form. The perimeter intervening between the slots $7^a$ of the wheel is provided with concave locking recesses $7^b$. Intermittent step by step rotation of the index wheel 7 and the shaft 6 and plate 5 is accomplished by means of a crank 8 which is secured on a short lever $8^a$ projecting radially from the upper end of a cylindrical sleeve 9, Fig. 1, slidably keyed upon a vertical shaft 10 supported at its upper and lower ends in bearings $2^b$ on the frame 2. The shaft 10 has on its upper end a collar $10^b$ supported on bearing $2^b$. The shaft 10, on which the sleeve 9 is slidably keyed, carries on its lower end a pinion 11 which meshes with and is driven by a gear 12 of three times the diameter of the pinion 11 and which is secured on a horizontally extending cam-shaft 13 journaled in appropriate bearings $2^c$ on the frame 2. Rotary motion is imparted to the cam-shaft 13 by any suitable driving means and is accomplished, in this instance, by a worm-wheel 14 which engages with and is driven by a worm 15 (shown in dotted lines, Fig. 1) secured on a horizontally extending driving-shaft 16 to which power may be imparted from any suitable source.

For the purpose of conserving space and making it possible to use a disk-plate 5 of as small diameter as may be conveniently done the inner series of mold-chambers $5^b$ are shown as each intermediately located between the mold-chambers $5^a$ of the outer series so that the chambers $5^b$ are diagonally disposed as to the adjacent chambers $5^a$. The mold-chambers $5^a$, $5^b$, extend from face to face, or from top to bottom, of the mold-plate 5 which, preferably, is of a thickness substantially equal to the depth of the depression $3^b$ in the top of the table 3 so that the top surfaces of the table 3 and the mold-plate 5 are substantially in the same plane. The upper surface of the depression $3^b$ of the table 3 forms the bottom of the mold-chambers $5^a$, $5^b$, and in practice the chambers are successively charged as they rotate past an operative at one side of the machine, the material being placed in the mold-chambers until these latter are substantially filled.

The rotation of the mold-plate 5 successively carries the mold-chambers $5^a$, $5^b$, beneath or in presentation to a compressing means which during a dwell in the motion of the mold-plate 5 is operative to enter the mold-chambers or chamber and compress the material to the requisite degree. While any suitable type of compressing means may be utilized which will operate to efficiently accomplish the desired result, a practicable, reliable and substantial form of compressor is here shown as comprising a set of plungers which are disposed in a substantially diagonal or oblique position as to the sides of the table 3 and are adapted to simultaneously operate to compress the material in a pair of the molds $5^a$, $5^b$, which at the moment assume a corresponding diagonal position. as to the table 3, beneath or in relation to the plungers. The plungers comprise each a threaded stem 17 carrying upon one end a plunger-head $17^a$ having internal threads fitting the threads of the stem 17 and providing thereby for the ready mounting or removal or interchange of a plunger-head $17^a$ when it is desired either to change the size of the cakes to be produced or for the production of cakes of a different form. The plunger stems 17 are supported in parallelism in a cross-head 18 provided with suitable bosses $18^a$ for the reception of the stems 17, these latter being provided with upper and lower clamp or lock-nuts $17^c$ whereby the plungers may be locked in the desired position in the cross-head 18 with respect to the proper movement relative to the mold-plate 5.

It is a feature of the present invention to provide means to eliminate the tendency of the sticky material, such for instance as coated pop-corn, while in a heated condition to adhere to the compressing means and one method of accomplishing this is had by providing the plunger-head $17^a$ with means whereby it may be cooled with a flowing cooling fluid. To that end the plunger-head $17^a$ is provided with a chamber $17^b$ for the circulation of water or any suitable fluid the circulation of which through the chamber $17^b$ is accomplished by the attachment of conductors or hose $17^c$ to nipples $17^f$ which are suitably attached to and project upwardly from the plunger-head $17^a$. While the present invention contemplates the use of a mold-plate 5 having a plurality of series of mold-chambers $5^a$, $5^b$, only one series of mold-chambers may be utilized if desired, but when a plurality of series are used, as in the present instance, the cooling fluid is circulated first to one of the jacketed heads $17^a$ and thence by a short and intermediate connection $17^g$ to the adjacent and successive plunger-head $17^a$ from which it may flow outward through the return conductor $17^e$. Flexible conductors are preferred, as admitting freely of relative movement of the plungers.

Figure 2:
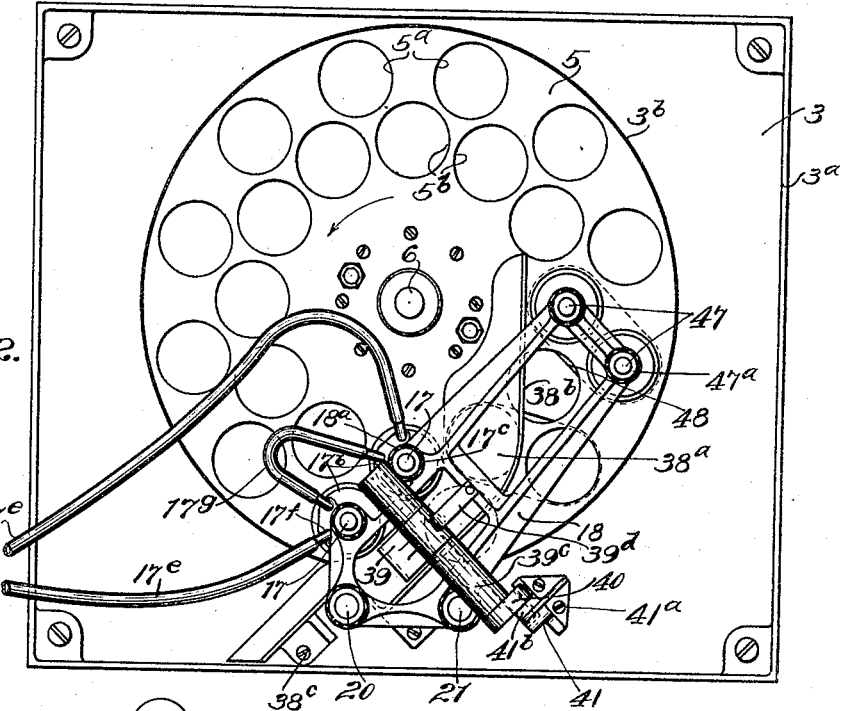
Fig. 2 is a plan view of the machine.

The cross-head 18 which carries the plungers 17 is in the form of a skeleton frame of a general oblong form in plan and is mounted at one end upon a pair of parallel, vertically extending carrier-rods 20, 21, Figs. 1 and 2, slidably operating in apertures formed for their reception in the table 3 to one side of the mold-plate 5 and also slidably operating in respective bearings $2^d$ formed in the horizontal members of the frame 2. The cross-head 18 is fastened for ready removal on the upper ends of the carrier-rods 20, 21, by nuts $18^b$.

The carrier-rods 20, 21, are adapted to be actuated in unison and in proper time through a suitable driving connection with the cam-shaft 13 and to that purpose there is secured upon these rods and in a plane below the cam-shaft 13 a yoke 22 which has hubs $22^a$ to receive the respective rods and upon the yoke 22 there is pivoted at $22^b$ a lever 23 having a short arm $23^a$ reaching over and adapted to engage the cross-shoulder of the yoke 22. The forward or inwardly projecting end of the lever 23 carries a cam-roll $23^b$ which is adapted to engage with the groove of an internal or closed cam 24 secured on the cam-shaft 13. One of the objects of the provision of the cam-lever 23 and its pivotal connection with the carrier-rod yoke 22 is to provide a safety device which will operate to automatically yield or give-away to insure the safety of, or prevent injury to, the parts of the machine in the event of any undue resistance occurring during the operation of the compressor such as would occur when any unyielding substance should happen to become lodged in the machine below the faces of the compressing plungers 17. To secure this desired protection to the parts of the machine, the end of the lever 23 which carries the cam-roll $23^b$ is secured to an adjacent arm $22^c$ of the yoke 22 by a relatively fragile pin or other suitable yielding connection 25, a simple type of which consists of a nail adapted to be inserted in suitable receiving apertures formed respectively in the extended boss $22^d$ of the arm or portion $22^c$ of the yoke and boss $23^c$ on lever 23, Fig. 1. To provide for the ready renewal of the give-away device or shearing pin 25 in the event of it becoming broken in functioning to disconnect the lever 23 from positive connection with the yoke 22 at the arm $22^c$, the boss $22^d$ may be provided with a small guard or cap $22^e$ pivotally mounted on a screw $22^f$ in the boss $22^d$. In action when any undue resistance is offered to the actuation of the rods 20, 21, and the parts carried thereby and which rods will be hereinafter referred to as a carrier, the fragile or give-away device 25 will operate to yield under this untoward resistance, and thereby destroy the rigid connection between the lever 23 and the yoke 22 and thereafter during the rotation of the cam 24 the lever 23 will be permitted to swing or rock on its pivot $22^b$ on the yoke 22. However, upon the first upward swinging action after fracture, by the cam 24 on the cam-lever 23 the short arm $23^a$ thereof will swing into engagement with the contiguous surface or shoulder of the yoke 22 and thereby cause the carrier to be moved in a direction to carry or withdraw the plungers 17 clear of the mold-plate 5 in which position the carrier and the plungers will be automatically maintained by the reaction of a suitable spring 26 the lower end of which is supported on one of the bearings of the carrier-rod 20 and at its opposite end engaging a set collar $26^a$ adjustably mounted on the rod 20.

Figure 3:
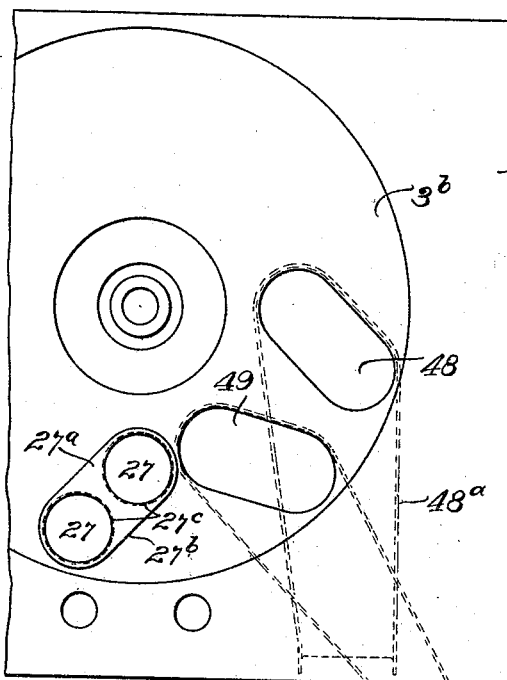
Fig. 3 is a plan view of the top or table of the machine separated therefrom and showing the stripper for preventing the crumbs and scrap from falling to the operating mechanism below the table.
Figure 4:
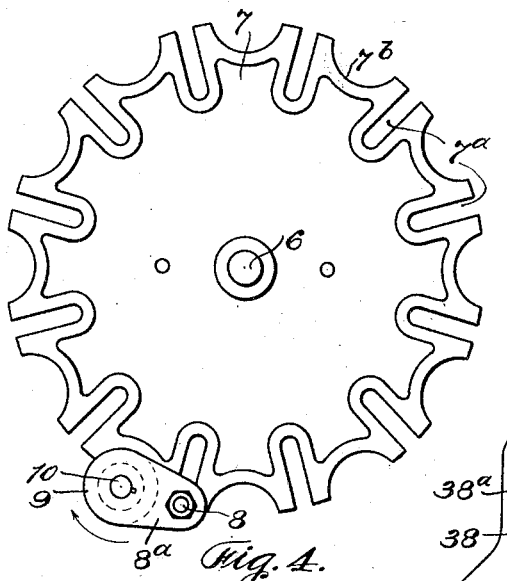
Fig. 4 is a detail plan view of the Geneva or intermittent-mold actuating mechanism including the indexing gear and its actuating crank.
Figure 6:
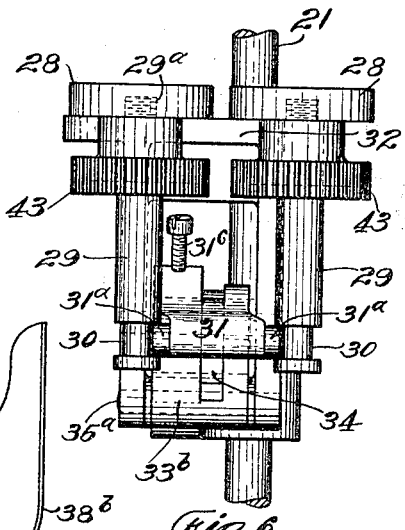
Fig. 6 is a detail view of the evener plungers with their associated coupler and a portion of the respective carrier-rod which actuates the coupler.

One of the features of this invention is to provide for the production of pop-corn cakes which will not only be crisp and well-shaped, making a neat and attractive confection, but to provide for the collection of excess material during the operation of the machine and afford a means for the separation of loose crumbs and scraps from the finished cake and in the accomplishment of this purpose the table 3 is provided with an aperture or apertures 27, Fig. 3 as may be requisite, in substantial alinement with the plunger or plungers 17 and providing for the reception of relatively movable bottom-forming members 28, Fig. 6, designed to conform to the shape of the mold-chambers $5^a$, $5^b$. The bottom members 28, in this case, are circular in form and each provided with a central threaded aperture so as to be removably mounted upon plunger-rods 29, respectively, which are provided each at one end with threaded-portions 29ª to fit the internal threads of the respective mold-bottom forming disk 28, and which are supported slidably in respective bearings of the horizontally extending portion 2ᵇ of the frame 2. During the compression stroke of the compressors, the members 28, lie in a normal position in the apertures 27 of the table 3 so that their upper surfaces form the bottoms of the mold-chambers 5ª, 5ᵇ, and provide for the intermittent relative movement of the mold-plate 5 to progressively present the diagonally disposed pairs of mold-apertures 5ª, 5ᵇ, to the compressors. After the material in a pair of the mold-chambers has been compressed the bottom forming members 28 are adapted to be moved into the mold-chambers to shift the compressed cake or cakes into the plane of the upper surface of the mold-plate 5 until the tops of the compressed cake are even or flush therewith, so that when the mold-plate 5 subsequently carries the compressed cake or cakes around or away from the compressing station the excess crumbs on the top surface of the mold-plate 5 may be cleared therefrom and collected and returned toward the opposite side of the mold-plate 5 to be used later. The evening movement of the plungers 29 carrying the mold-bottom forming disks 28 or evening devices may be accomplished in proper sequence to shift the cakes by any suitable form of mechanism. A type of evener-actuating mechanism is here shown as comprising a device coacting with the plungers 29, which are grooved annularly at 30 near their lower end, and consists of a broad substantially horizontally disposed lever 31, Figs. 6, 8 and 9 on the opposite sides of one end of which there are provided rolls 31ª of a diameter to coöperatively fit in the groove 30 of the plungers 29. The lever 31 is mounted upon a pivot 31ᵇ which extends across and is supported in the pendant sides of a bracket or bearing piece 32 which may be appropriately secured as by a screw or other device passing through a perforation provided in a lateral ear of the bracket 32 to receive the fastening device. The lever 31 forms a part of an actuating train or coupler which includes a dog 33 in the form of a bell-crank on a pivot 33ª in the lower end of the pendant sides of the bracket 32. One arm 33ᵇ of the dog 33 inclines upwardly toward the axis of operation of the lever 31 and is flexibly connected at 33ᶜ to the lower end of a toggle link 34 which in turn is connected at its upper end to the arm of the lever 31 projecting oppositely from the pivot 31ᵇ to the position of the evener plungers 29. The short arm of the dog 33 projects substantially in a horizontal plane to be engaged and actuated by a suitable device shown here as a yieldingly mounted tappet 35 pivoted intermediate its length on a stud or pivot 35ª mounted in an arm or bracket 36, Figs. 8 and 9, adjustably fastened on the carrier-rod 21, Fig. 1, by a set-screw 36ª, Figs. 1 and 8. The pivot 35ª projects normally with relation to the carrier-rod 21 and the tappet 35 stands in a position with one of its faces diagonal to the length of the rod 21. The position of the tappet 35 may be readily adjusted so that its upper forwardly extending end shoulder 35ᵇ will move in a path, as the rod 21 descends, to engage and pass over the adjacent upper curved surface of the lever actuating dog 33. The tappet 35 may yield in one direction against a spring 35ᶜ one end of which bears on an adjacent face of the upper end of the pivoted tappet while its opposite end is seated upon a boss or lug 36ᵈ on the bracket 36. The relative projection or position of the tappet shoulder 35ᵇ may be precisely determined by an adjusting abutment screw 37 having a lock-nut 37ª, and threaded in the lower portion of the bracket 36 and in a plane to project against the lower end of the tappet 35. When the carrier-rod 21 is moved downwardly by the operation of its actuating-cam 24 the tappet 35 moves past the adjacent end of the dog 33 and automatically yields against its spring 35ᶜ so that the downward or compressing motion of the carrier-rod 21 is inoperative upon the coupler device, including the dog 33 and the lever 31 connected thereto by the link 34. However, when the cam 24 during its rotation reciprocates the carrier-rods 20, 21, upwardly to withdraw the compressing plungers from the mold-plate 5 the tappet shoulder 35ᵇ moving upwardly will encounter the over-hanging end of the dog 33 and the latter will be rocked to the left, Fig. 9, on its pivot 33ª and this rocking motion will be transmitted through the link 34 to rock the lever 31 on its fulcrum 31ᵇ and raise the evener-rods 29 simultaneously, and to an equal extent, to carry the mold-bottoms or disks 28 upwardly into the respective chambers 5ª, 5ᵇ, of the mold-plate and shift the cakes in the chambers to such a position that their upper surfaces will be evened or brought flush with the upper surface of the mold-plate 5, or in other words, be brought into alinement with that face of the mold-plate 5 adjacent the compressing plungers. As the carrier-rod 21 continues to move upwardly the dog 33 moving in an arc will automatically ride-off of the upper projecting shoulder 35ᵇ of the tappet 35, whereupon the eveners, which include the plunger-rods 29 and the members 28 forming the bottom of the mold-chambers, will automatically recede under gravitation from the mold-chambers to their normal position in the apertures 27, Fig. 3, in the table 3. In the event of the failure of the eveners to recede from their mold-chambers the tappet shoulder 35 is adapted to positively engage an overhanging retracting screw 31$^c$ threaded in the projecting portion of the lever 31 above the tappet 35. This engagement of the tappet shoulder in its ascending movement with the adjustable retracting screw 31$^c$ will insure the positive recession of the eveners from the mold-plate 5 so that the latter may, in its proper time, be actuated without interference. The thickness of the cakes to be produced may be readily varied by the change of position of the plunger-screws 17 by the loosening and respective adjustment of their locking or clamp-nuts 17$^c$ as the occasion requires and for the purpose of varying the amount of movement of the eveners, as necessary, the throw of the coupling device including the dog 33 may be changed by the change of the angular position of the tappet 35 on its fulcrum 35$^a$ so as to vary the period of contact between the tappet 35 and the dog 33 during the coupler actuating stroke of the carrier-rod 21. This change of stroke or movement of the evener plungers 29 is accomplished by the adjustment of the stop-screw 37 in the bracket 36 on the carrier-rod 21 to control the period of engagement and time of disengagement of the tappet 35 with the coacting arm of the dog 33.

Figure 7:
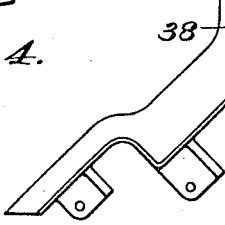
Fig. 7 is a plan view of the clearing collector separated from the machine.

The object of changing the position of the compressed cakes in the mold-chambers 5$^a$, 5$^b$, is to eliminate the pockets formed above the cake by the compression of the comparatively loose pop-corn in the mold-chambers, and thus avoid the possible collection of loose grains of pop-corn in such a pocket. When the cakes have been shifted to even the upper surfaces thereof with the top plane of the mold-plate 5, any crumbs or excess material on the surface will be effectually cleared therefrom and collected and returned to the opposite side of the mold-plate to be used to fill mold-chambers. This clearance and collection of the excess material and crumbs is accomplished by a tray-like device 38, Fig. 7, which has a relatively thin horizontal lip or bottom portion 38$^a$ and a rear and upwardly extending flange 38$^b$ of suitable height, fastened by screws 38$^c$, Fig. 2, to the top of the table 3 in such a position as to project inwardly over and close to the top surface of the rotary mold-plate 5 so as to effectually clear this surface of the crumbs and excess material thereon as the mold-plate 5 moves in progressive steps from the molding or compressing position to a station at which the compressed cakes are subsequently ejected from the mold-chambers. The clearing collector 38 is of such contour, in plan, that a portion of the edge of the lip 38$^a$ lies in a position substantially tangent to one side of a pair of mold-chambers as they are brought successively into position to coincide with the plungers 17. From this tangential position the front edge of the lip projects substantially radially inwardly over the top of the mold-plate 5 so as to effectually gather the material within the inner series of the mold-chambers 5$^b$. The crumbs collected on the horizontal lip 38$^a$ are prevented from again moving in the direction of rotation of the plate 5, by the rear vertical wall 38$^b$ of the collector. This material as it accumulates on the lip 38$^a$ of the collector is automatically swept along the surface of the lip 38$^a$ in a direction diametrically across the top of the plate 5 by a device mounted for operation on the cross-head 18 and which is actuated at each downward and upward reciprocation of the carrier. The device comprises a pendant blade or arm forming a sweep 39, Fig. 1, having a hub 39$^a$ which is secured on a horizontally disposed rock-shaft 39$^b$ journaled in bearings 39$^c$ projecting upwardly from the cross-head 18. On one end of the rockshaft 39$^b$ there is secured a crank 40 having a crank-pin 40$^a$ which is disposed to move in a path between projections formed on a fixed abutment member 41 fastened by screws 41$^a$, in its foot, to the top of the table 3. Abutment shoulders 41$^b$ on one side of the abutment member 41 are spaced relatively to each other at such a distance that upon the downward movement of the carrier cross-head 18 the crank-pin 40$^a$ will engage the lower shoulder 41$^b$ before the limit of downward movement of the cross-head 18 under the action of its cam 24 whereupon the crank 40 will be tilted and rock the shaft 39$^b$ sufficiently to throw the sweep 39 in an arc across and above the surface of the clearing lip 38$^a$ and sweep the collected excess material along the lip toward the charging station at the opposite side of the plate 5. Upon a reversal of movement of the carrier cross-head 18 to withdraw the compressing plungers from the mold 5, the sweep 39 will be automatically returned to its original forward position, Fig. 1, when the crank-pin 40$^a$ in its upward movement encounters the upper abutment lug 41$^b$ which, reacting on the crank-pin, prevents it from further upward movement and thereby rocks the rockshaft 39$^b$. It will be seen that the sweep 39 moves downwardly with the carrier cross-head 18 in a position from which it will be moved to sweep the material along the clearer once in each descending movement of the carrier. A friction brake 39$^d$ holds the sweep 39 against accidental movement.

Figure 5:
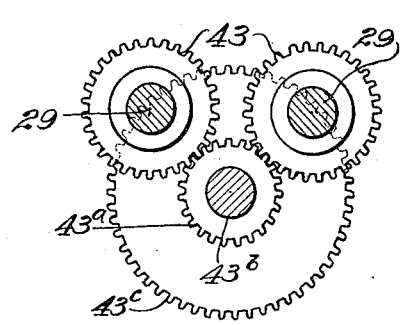
Fig. 5 is a detail, sectional view illustrating the intermediate driving gear and pinion, and the shaft thereof which rotates the evener plungers, the stems of which are in section.

While the sticky material upon which the machine may be operating is prevented from adhering to the acting face of the plunger-heads 17$^a$ by reason of the cooling of these heads through the circulation of a cooling fluid through the jacketed heads and the conductors 17, the material may be prevented from adhering to the acting faces of the evener disks 28 by a different method which consists in imparting to the evener disks a movement substantially at right-angles to the direction of movement of the compressing plungers during the compressing process. This motion of the evener disks is obtained by securing to each of the evener plungers 29 a pinion 43, Figs. 1, 5, and 6, which both mesh with an intermediate pinion 43ᵃ secured on a short vertical shaft 43ᵇ journaled in the horizontal arm 2ᵇ of the frame 2 and on which is secured a larger gear 43ᶜ. The gear 43ᶜ is disposed in a plane, Fig. 1, to mesh with a pinion 44 which is secured on the vertical crank-shaft 10 carrying the bevel-pinion 11. The continuously operating cam-shaft 13 drives, through means of the bevel gears 11, 12, the shaft 10 at a rate of speed substantially three to one of the cam-shaft. This rotary motion is transmitted by the pinion 44 to the shaft 43ᵇ, Fig. 5, at a reduced speed through the gear 43ᶜ and this speed is again reduced by the pinion 43ᵃ which meshes with the larger gears 43 on the evener plungers 29. This train insures the constant rotation, slowly, of the evener disks 28 which entirely obviates the tendency of the cake to stick while being compressed and after compresssion while being shifted in the mold-chambers 5ᵃ, 5ᵇ, by the upward movement of the eveners, so that the cakes are ultimately finished, with smooth upper and lower surfaces which are unbroken in appearance. The relative shifting movement of the evener gears 43 with relation to the non-shifting pinion 43ᵃ is provided for by the sliding of the pinions 43 on the pinion 43ᵃ without loss of rotative coaction.

As the size of the cakes to be produced may be varied at will by the interchange of the coacting mold-members including the mold-plate 5, the plunger-heads 17ᵃ and the evener disks 28, it is desirable to provide an efficient means for preventing the escape of crumbs and scrap through the apertures 27 of the table 3 to the lower operating mechanism and to that end there is provided a stripper-plate 27ᵃ, Fig. 3, which may be suitably fastened in the table 3 which latter is counter-sunk at 27ᵇ to provide a recess for the reception of the stripper-plate 27ᵃ so that the surface of the latter will be substantially flush with the surface at the bottom of the table recess 3ᵇ. The stripper-plate 27ᵃ is provided with one or more apertures 27ᶜ as may be necessary, and which are of such diameter, respectively, as to snugly, but slidably, fit the annular surface in the present instance, of the evener members 28.

Inasmuch as the shaft 13 is continuously operating and in consequence the pinion shaft 10 is also continuously operated and since the Geneva or index wheel 7, which is secured on the mold-plate-shaft 6, is driven from the continuously operated shaft 10 it is desirable to provide for the intermittent movement of the index-wheel 7 by the shaft 10 without interrupting the continuous operation of the latter, which, as before stated, is utilized to continuously rotate the evener disks 28, these rotating while the mold-plate 5 is momentarily idle to allow for the reciprocation of the compressing-plungers to compress the material in the mold-chambers of the mold and withdraw. This is obtained readily by the provision of means to intermittently position the crank 8 of the shaft 10 so that it will, in proper sequence, engage the walls of one of the slots 7ᵃ of the wheel 7 and maintain engagement for a sufficient period to turn the index wheel 7 and with it the mold-plate 5 to bring a diagonally disposed pair of the inner and outer mold-chambers 5ᵃ, 5ᵇ, into registry with the compressing-plungers. Therefore, once in each third revolution of the crank 8, it is shifted downwardly on its shaft 10 into a plane so that it will swing during one-half of its revolution, approximately, in engagement with a continuous slot 7ᵃ of the wheel 7, by a shipper including a stem 45 slidably mounted in a bearing on the frame 2 and having on its lower end a yoke or loop 45ᵃ straddling the cam-shaft 13 and carrying the cam-roller 45ᵇ which engages the cam surface of an internal slotted cam 45ᶜ secured on the shaft 13. On the upper end of the shipper-stem 45 is secured a horizontally projecting arm 45ᵈ having a roller 45ᵉ engaging the walls of an annular groove provided therefor in the cylindrical body or hub 9 carrying the crank-lever 8ᵃ. The form or contour of the cam-groove of the cam 45ᶜ is such that once during each third revolution of the shaft 10, the slidable cylinder 9 will be lowered into such a plane that for half or approximately half a revolution of the shaft 10, the crank 8 will swing in a plane enabling it to enter a contiguous slot 7ᵃ and engage the walls thereof and turn the index wheel 7 one-twelfth of a revolution, Fig. 4, and leave it disposed so that a pair of the mold-chambers 5ᵃ, 5ᵇ, will be in register with the compressing plungers. As the crank 8 swings out of the momentarily engaged slot 7ᵃ, the shipper 45 is operated by the cam 45ᶜ to again lift the crank-cylinder 9 to carry the crank 8 out of the plane of the wheel 7. The wheel 7 is locked in each of its positions at which it dwells after being disengaged by the crank 8 by the engagement of the surface of the cylinder 9 with the adjacent concaved surface 7ᵇ formed to coöperate therewith. To provide for the rotation of the wheel 7 when engaged by the crank 8 the wheel-locking cylinder 9 is cut away for a half of its circular area to provide an opening 9ª just below the lower surface of crank lever 8ª so that when the locking cylinder 9 is in its lowered position to permit the crank 8 to engage the wheel 7, the projecting points of the rim of the latter sweep through the clearance 9ª without interference. This Geneva movement is reliable, practicable and positive in its action and at once serves as an actuating and a locking device for the mold-plate 5, which is thereby gradually started and stopped in its intermittent progressive steps during the operation of the machine.

Once in each rotation of the cam-shaft 13 the cam 24 moves the carrier including the rods 20, 21, and the cross-head 18 to carry the compressing plungers into an alined pair of mold-chambers 5ª, 5ᵇ, to compress a charge of material in the mold-chambers and then actuates the carrier to withdraw the plungers from the mold-plate. During withdrawal or ascending movement of the carrier the tappet 35 on the bracket 36 on rod 21 will move upwardly into contact with the dog 33 so that the coupler lever 31 will automatically rock about its axis 31ᵇ and the plungers 29 shifted so as to carry their evener disks 28 out of their recesses 27 in the table 3 and into the alined mold-chambers to shift the cakes therein and even the upper surfaces thereof with the upper surface of the mold-plate 5. As the compressors clear the mold-plate the cam-actuated shipper 45 operates to shift the locking cylinder 9 on the shaft 10 to unlock the index wheel 7, move the clearance slot 9ª in the cylinder 9, into the plane of the index wheel, and bring the crank 8 into the plane of the adjacent slot 7ª toward which the crank is rotating and move the wheel 7 one-twelfth of a turn thus shifting the mold-plate 5 so as to carry the last pressed cakes from the compressing station at the compressors, one step along and bring the next succeeding pair of mold-chambers 5ª, 5ᵇ, into register with the compressors. This intermittent operation of the mold-plate 5 continues until the pressed cakes are ultimately brought into a position beneath an ejecting device, of which a suitable form may be utilized, and in this embodiment comprises a pair of ejectors. These ejectors consist each of a threaded plunger or stem 47 provided with sets of lock-nuts 47ª and are adjustably mounted in respective bearings 47ᵇ formed in the cross-head 18 which has a portion projecting over the mold-plate 5. On the lower ends of the ejector stems 47 are secured ejector heads 47ᶜ of a shape to conform with the shape of the respective mold-chambers 5ª, 5ᵇ.

As the ejectors 47 are mounted on the cross-head 18 in suitable position with relation to the diagonally disposed pairs of mold-chambers 5ª, 5ᵇ, they will operate simultaneously with the compressors 17 enabling the machine at one operation to compress a plurality of cakes and to eject a plurality of cakes. The cakes as they are engaged by the ejectors 47 are forced downwardly from the mold-plate 5 and pass freely through an elongated aperture 48 formed in the bottom of the depressed portion of the table 3 thence falling into a chute 48ª which leads them to a conveyer belt, not shown, but which is adapted to be mounted on a driving drum 48ᵇ on the cam-shaft 13. The cakes are conveyed by the said conveyer to any suitable point of delivery.

As before stated the excess material is collected by the clearing collector 38 which is disposed at a position intermediately between the station at which the compressors operate and the station at which the ejectors 47 operate so that there are no crumbs carried around on the outer portion of the mold-plate and therefore cannot be pressed by the ejectors into the upper smooth surface of the cakes as these are successively presented to the ejectors.

The loose crumbs which may be occasionally carried by the mold-plate 5 around in the mold-chambers below the cakes from the compressing station, because of their failure to be embedded in the cake for any reason, are disposed of before they reach the aperture 48 in the table 3, at which the cakes are ejected, by the intervention of a scrap opening 49 which is obliquely disposed in the bottom of the depressed portion 3ᵇ of the table 3. Each cake as it is carried around by the mold-plate 5, and while frictionally held to the walls of the mold-chambers, passes over the scrap-opening 49 and the loose scraps permitted to fall freely away from the cake or cakes and into a scrap chute 49ª.

I claim as my invention:—

1. In a machine for compressing warm sticky material into cakes, the combination, with a mold, and means coöperative with the mold for pressing the material into cakes, of means for the cooling of the said compressing means to prevent the adherence of the cake to the compressing surface of the said compressing means.

2. In a machine for compressing warm sticky material into cakes, the combination, with a mold, of plunger means for compressing the material in the said mold into cakes, and fluid cooled to prevent the sticky material adhering to the compressing surface of the said means.

3. In a machine for compressing warm sticky material into cakes, in combination, a mold, means coöperating with the mold for compressing the material in the mold into cakes, means providing for the circulation of a cooling medium to prevent the adherence of the material to the compressing surface of said compressing means, and a bottom for the mold, which, during the compressing process, is given movement relative to the cake to prevent the adherence of the cake to the acting face of the mold bottom.

4. A machine for compressing warm sticky material into cakes, comprising a plunger head provided with means for the circulation of a cooling fluid whereby during the compressing operation the sticky material is prevented from adhering to the operative face of the plunger head.

5. In a machine for compressing warm sticky material into cakes in combination, a mold having a molding chamber, means for entering the mold chamber to compress the material therein and cooled to prevent the material adhering to the operative face, and a bottom forming a closure for one side of the mold chamber and upon which the material is compressed and which has a rotary movement to prevent the compressed cake from adhering to the acting face of the bottom.

6. In a machine for making cakes, in combination, a mold having a molding chamber, and means for compressing the material in the mold chamber, an evener for subsequently changing the position of the finished cake in the chamber to present one face of the cake even with the plane of one surface of the mold to eliminate the recess produced by the compression of the material adjacent that side, an ejector engaging with such face for displacing the cake from the mold-chamber, and a clearer for removing crumbs from the evened surface of the mold and cake to prevent the crumbs from being embedded in the cake by the ejector during its operation.

7. In a machine for making cakes, in combination, a mold movable from a compressing station to an ejecting station and having a molding chamber, a compressing plunger coöperative with the mold at the compressing station to compress the material in the mold into a cake, an ejector engaging with one face of the compressed cake at the ejecting station for ejecting the cake from the mold, and a device for evening the said face of the compressed cake with a surface of the mold to permit the removal of excess crumbs before the cake is presented to the ejector.

8. In a machine for making cakes, in combination, a mold movable from a compressing station to an ejecting station and having a molding chamber, opposed compressing plungers coöperative with the mold at the compression station to compress the material in the mold chamber into a cake, one of said plungers movable to even one surface of the cake with one surface of the mold, means at the ejecting station acting upon said surface for displacing the cake from the mold, and means interposed between the location of the compressing plungers and of the ejecting means, operative to clear the surface of the mold of crumbs before the cake is carried to the said ejecting means.

9. In a machine for making cakes, in combination, a mold movable progressively between a charging station, a compressing station and an ejecting station and having a molding chamber, means at the compressing station for compressing the material with which the chamber is charged and operative to change the position of the pressed cake to eliminate the pocket formed by the compression to prevent crumbs collecting on the cake, means for ejecting the cake at the ejecting station, collecting means in advance of the ejecting station, for clearing the surface of the mold of crumbs, and means for returning the collected crumbs to the charging station.

10. In a machine for making cakes, in combination, a molding plate movable progressively between charging, compression and ejecting stations, respectively, means at the compressing station operable to compress into cakes the material with which the mold is charged, means at the ejecting station to displace the compressed cake from the mold plate, a clearer and collector for gathering excess crumbs from the plate surface, and a sweep mounted adjacent the collector and operative to move the collected crumbs thereon toward the surface of the plate at the charging station.

11. In a machine for making cakes, in combination, a molding plate having a series of mold chambers, a compressor mounted to successively enter each mold chamber and compress the material therein into a cake, an evener movable to shift the compressed cake in the said chamber to dispose one of its faces flush with a face of the molding plate and thereby eliminate the pocket caused by the compression of the material into a cake, an ejector acting upon said face for successively displacing cakes from the molding plate, and a clearer disposed so as to clear the adjacent face of the plate with which the cakes are evened in advance of relative movement of the molding plate with cakes to the ejector.

12. In a machine for making cakes, in combination, a mold having a molding chamber, a compressing plunger coöperative with the mold to compress the material therein into cakes, a plunger forming a bottom for the mold chamber in opposition to the compression plunger and actuating means for the last mentioned plunger operating to move the same into the mold chamber during the withdrawing movement of the compressing plunger to shift the compressed cake so that its face adjacent the compressing plunger is evened with the surface of the mold disposed toward the compressing plunger, and a clearer disposed with relation to the mold so that upon movement of the mold excess crumbs will be cleared from the surface of the mold with which the cake has been evened.

13. In a machine for making cakes, in combination, a molding plate having a series of mold chambers into which the material to be compressed is charged, a compressor mounted to enter successively each of the said chambers to compress the charge therein, an ejector for subsequently displacing the cakes successively from the molding plate, means operating in a position in advance of the ejector for returning the excess material to a position for use in charging the mold chambers, and means for simultaneously actuating the said compressor, said ejector and the said excess returning means.

14. In a machine for making cakes, in combination, a molding plate having a series of mold chambers, members forming opposed face walls between which the material in the successive chambers is compressed when one of the chambers and said members are brought into relative coincidence, and an ejector mounted for movement to displace cakes from said chambers, one of said members being operative to dispose the compressed cake in each chamber with one face even with the face of the plate presented to the ejector to eliminate any pocket at the cake wherein crumbs may collect.

15. In a machine for making cakes, in combination, a mold having a molding chamber with opposite open sides, means coöperable with the mold to compress a charge of material in the mold chamber, said mold and said means adapted for relative change of position to permit the displacement of the compressed cake from the mold chamber, and a table having a scrap-opening, said mold being operable over the table to carry the cake in said chamber over the scrap opening to permit the loose crumbs thereat to be freely discharged while the cake remains in the mold.

16 In a machine for making cakes, in combination, a mold having a molding chamber with opposite open sides, means for compressing the material therein into a cake, means operative to shift the compressed cake in the mold chamber to eliminate the pocket formed by the compression of the material and even a face of the cake with a face of said mold, said mold and the said shifting means being relatively movable to permit the scrap crumbs to escape.

17. In a machine for making cakes, in combination, a mold having a molding chamber for the material to be compressed, a compressor coöperable with the mold to compress the material therein into cakes, mechanism for intermittently actuating the compressor comprising a carrying rod, to which the compressor is attached, a continuously operating shaft carrying a driver for said rod, and a safety connection between the said driver and said rod adapted to give away at predetermined pressure to operatively disconnect the driver from the said rod, said plunger being adapted to maintain a position clear of the mold after the safety device has given away.

18. In a machine for making cakes, in combination, a mold having a molding chamber for the material to be compressed, a compressor coöperable with the mold to compress the material therein into cakes, a continuously operating shaft with a driver for intermittently actuating the said compressor, a safety means operatively connecting the said driver and the said compressor and adapted to give away under predetermined resistance and operative, after it has given away, by said driver to return the plunger to a position clear of the mold, and a yielding support for maintaining the plunger in a position clear of mold after the safety means has given away.

19. In a machine for making cakes, in combination, a mold having a molding chamber for the material to be compressed, a compressor coöperable with the mold to compress the material therein into cakes, a carrying rod to which the said compressor is attached, an actuating shaft with a cam for operating the carrying rod, a cam lever pivotally connected to the said rod and having operative engagement with the cam, and a give away for connecting the lever and the said rod for normal operation thereof by the cam, adapted to yield under predetermined resistance during the operation of the machine and thereafter work on its pivot to prevent the operative or compressing stroke of the compressor by the cam shaft, and arranged to withdraw the compressor clear of the mold.

20. In a machine for making cakes, in combination, a mold having a molding chamber, a compressing plunger coöperative with the mold to compress the material therein into cakes, a plunger forming a bottom for the mold chamber and mounted for movement into the mold chamber during the withdrawing movement of the compressing plunger to shift the compressed cakes so that its face adjacent the compressing plunger is evened with the surface of the mold disposed toward the compressing plunger, said bottom plunger then receding, a clearer disposed with relation to the mold so that upon relative movement of the mold and the clearer excess crumbs will be cleared from the surface of the mold with which the cake has been evened, and means for rotating the bottom plunger to prevent the adherence of the sticky material thereto and thereby obviate any tendency of the cake to recede with the bottom plunger.

21. In a machine for making cakes, in combination, a molding plate having a molding chamber for the material to be compressed, a compressing plunger mounted with relation to one face of the molding plate and adapted to compress the material therein into a cake, a bottom forming evener operable to enter the mold chamber, to move the compressed cake to even a face thereof with the face of the mold plate toward the compressing plunger, and then recede from the mold, and means for operating the compressing plunger to compress the material in the mold and subsequently withdraw the plunger and simultaneously actuate the evener to shift the compressed cake in the mold.

22. In a machine for making cakes, in combination, a molding plate having a molding chamber for the material to be compressed, a compressing plunger mounted with relation to one face of the molding plate and adapted to compress the material therein into a cake, a bottom forming evener oppositely disposed to the said plunger and operable to enter the mold chamber, to move the compressed cake to even a face thereof with face of the mold plate toward the compressing plunger, and then recede from the mold, and means for operating the compressing plunger to compress the material in the mold and subsequently withdraw the plunger and simultaneously actuate the evener to shift the compressed cake in the mold, and operative to insure the recession of the evener in the event of its failure to automatically return therefrom.

23. In a machine for making cakes, in combination, a mold-plate having a molding chamber, a compressing plunger for compressing the material in the said chamber into a cake, a plunger movable into the mold to shift the cake to bring one of its faces into the plane of one face of the mold-plate, a carrier for the compressing plunger, means for operating the carrier to move the compressing plunger into and out of the mold, and a coupler operable by the carrier during the withdrawing movement of the compressing plunger to advance the bottom plunger into the mold chamber of the plate to shift the cake therein.

24. In a machine for making cakes, in combination, a mold-plate having a molding chamber, a compressing plunger for compressing the material in the said chamber into a cake, a plunger movable into the mold to shift the cake to bring one of its faces into the plane of one face of the mold-plate, a carrier for the compressing plunger, means for operating the carrier to move the compressing plunger into and out of the mold, a coupler operable by the carrier during the withdrawing movement of the compressing plunger to advance the bottom plunger into the mold chamber of the plate to shift the cake therein, and means for varying the length of stroke of the coupler and the plunger operated thereby.

25. In a machine for making cakes, in combination, a turnable molding plate with a series of molding chambers, a table above which the plate is mounted for operation and having a surface forming a bottom for the mold chambers to support the material therein to be compressed into a cake, a pair of coöperative plungers forming opposite compression members and one of which is disposed to operate in a hole in said table and form a bottom for the mold chambers as they move into coincidence with said plungers and the plunger hole in the plate, means for relatively operating the plungers to compress the material in a mold chamber thereat, and an ejector for displacing the compressed cakes, from the mold-plate, said table having an opening between the compression position and the ejecting position of the plate to permit the separation of the scrap from the cake before it is ejected.

26. In a machine for making cakes, in combination, a turnable mold-plate with a series of molding chambers, a table above which the plate is mounted for operation and forming a bottom to support the material in the mold chambers, means for compressing the material in the mold-chambers and an ejector for displacing the compressed cake, said table having an opening disposed in a position between the compressing means and the ejecting means for permitting the loose scrap to be separated from the cake before it is ejected from the plate.

27. In a machine for making cakes, in combination, a mold-plate having molding chambers for the material to be made into cakes, means for compressing the material in the mold-chambers into cakes, a continuously operating shaft for actuating said means, and a Geneva movement actuated by the said shaft for intermittently turning the said mold-plate to successively present the said chambers to the compressing means and whereby the mold-plate is alternately locked to permit the operation of the compressing means.

28. In a machine for making cakes, in combination, a mold-plate having a plurality of molding-chambers for the material to be made into cakes, means for compressing the material in the chambers into cakes, a continuously operating shaft for actuating the said means, a gear shaft driven thereby at a differential speed, a Geneva movement for intermittently and alternately driving and locking the said shaft so that the said compressing mechanism successively operates in the mold-chambers, said movement including an index wheel connected to the said plate and a driving crank therefor on the said differential shaft, and means for providing for the coaction of the said crank and the said wheel in proper sequence with respect to the operation of the compressing means.

29. In a machine for making cakes, in combination, a mold-plate having a plurality of molding-chambers for the material to be made into cakes, means for compressing the material in the chambers into cakes, a continuously operating shaft for actuating the said means, a gear-shaft driven thereby at a differential speed, a Geneva movement for intermittently and alternately driving and locking the said shaft so that the said compressing mechanism successively operates in the mold-chambers, said movement including an index wheel connected to the said plate and a driving crank therefor on the said differential shaft, and a member adapted to enter said molding chambers and even the compressed cake with one surface of the plate and which member is continuously actuated by the said differential shaft to prevent the adherence of the cakes to the said member.

30. The improvement in the art of making pop-corn cakes and the like which consists in subjecting the warm sticky material to compression in molds, and cooling the said molds by a circulating medium whereby adherence of the pressed cake to the surfaces of the molds is prevented.

In testimony whereof I affix my signature in presence of two witnesses.

EUSTACE R. KNOTT.

Witnesses:
CHAS. F. RANDALL,
ELLEN O. SPRING.